United States Patent
Maeda et al.

(10) Patent No.: US 7,682,028 B2
(45) Date of Patent: Mar. 23, 2010

(54) IMAGE TRANSMISSION SYSTEM AND IMAGE TRANSMISSION METHOD

(75) Inventors: Tsuyoshi Maeda, Hyogo (JP); Takashi Watanabe, Osaka (JP); Yasuaki Sakanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 10/590,967

(22) PCT Filed: Mar. 8, 2005

(86) PCT No.: PCT/JP2005/003951
§ 371 (c)(1),
(2), (4) Date: Aug. 29, 2006

(87) PCT Pub. No.: WO2005/088908
PCT Pub. Date: Sep. 22, 2005

(65) Prior Publication Data
US 2008/0158438 A1 Jul. 3, 2008

(30) Foreign Application Priority Data
Mar. 10, 2004 (JP) .............................. 2004-068061

(51) Int. Cl.
*G03B 21/00* (2006.01)
*G03B 21/26* (2006.01)
*G06T 1/60* (2006.01)
*G06T 13/00* (2006.01)

(52) U.S. Cl. ........................... 353/30; 353/31; 353/121; 353/122; 345/530; 345/537

(58) Field of Classification Search ............. 353/30–31, 353/121–122; 348/584, 588, 598; 345/1.2–1.3, 345/2.1–2.3, 537, 635–636, 530
See application file for complete search history.

(56) References Cited

U.S. PATENT DOCUMENTS 6,010,403 A * 1/2000 Adam et al. ................... 463/6

(Continued)

FOREIGN PATENT DOCUMENTS

JP 10-039966 2/1998

(Continued)

OTHER PUBLICATIONS

"HP LaserJet 2400 Printer Series—Specifications and Warranty", Hewlett Packard, Apr. 9, 2005, http://web.archive.org/web/20050409023719/http://h10010.www1.hp.com/wwpc/us/en/sm/WF06a/18972-236251-236263-14638-f51-416419.html.*

*Primary Examiner*—Georgia Y Epps
*Assistant Examiner*—Jori S Byrne-Diakun
(74) *Attorney, Agent, or Firm*—Wenderoth, Lind & Ponack, L.L.P.

(57) ABSTRACT

An image transmission system enabling a user to recognize a communication status between a PC and a projector, and including a PC (300) as an image generating apparatus and a projector (400) as an image projecting apparatus. The projector (400) monitors a status of communication with the PC (300), and includes a status monitoring unit (402) generating information related to the communication status being monitored, and also a projector communication unit transmitting the generated information related to the communication status to the PC (300). The PC (300) includes a PC communication unit (301) receiving information related to the communication status from the projector (400), a beacon analyzing unit (302) analyzing the received information and a display output unit (303) displaying a result of the analysis by the beacon analyzing unit (302).

14 Claims, 9 Drawing Sheets

U.S. PATENT DOCUMENTS

| | | | |
|---|---|---|---|
| 6,388,654 B1* | 5/2002 | Platzker et al. | 345/156 |
| 6,473,088 B1* | 10/2002 | Matsumoto et al. | 345/530 |
| 6,793,352 B2* | 9/2004 | Karasawa et al. | 353/122 |
| 6,907,551 B2* | 6/2005 | Katagiri et al. | 714/57 |
| 6,983,225 B2* | 1/2006 | Sprogis et al. | 702/188 |
| 7,237,004 B2* | 6/2007 | Slobodin et al. | 709/204 |
| 2001/0017630 A1* | 8/2001 | Sakashita et al. | 345/635 |
| 2004/0130568 A1* | 7/2004 | Nagano et al. | 345/733 |
| 2004/0227900 A1* | 11/2004 | Sato et al. | 353/30 |
| 2004/0246236 A1* | 12/2004 | Hildebrandt et al. | 345/169 |
| 2004/0249613 A1* | 12/2004 | Sprogis et al. | 702/188 |
| 2005/0174547 A1* | 8/2005 | Yamaguchi et al. | 353/122 |
| 2005/0270499 A1* | 12/2005 | Ishii et al. | 353/94 |
| 2005/0280640 A1* | 12/2005 | Bonorden et al. | 345/204 |
| 2007/0257927 A1* | 11/2007 | Sakanishi et al. | 345/581 |

FOREIGN PATENT DOCUMENTS

| | | |
|---|---|---|
| JP | 2002-223218 | 8/2002 |
| JP | 2002-271337 | 9/2002 |
| JP | 2003-258809 | 9/2003 |
| JP | 2003-330436 | 11/2003 |

\* cited by examiner

IMAGE TRANSMISSION SYSTEM AND IMAGE TRANSMISSION METHOD

METHOD

1. Technical Field

The present invention relates to an image transmission system and an image transmission method for transmitting an image from an image generating apparatus such as a personal computer (denoted as PC hereinafter) to an image projecting apparatus such as a projector.

2. Background Art

A projector that receives an image signal from a PC and projects a PC display image onto a screen and the like has become popular in recent years. Such a projector can be used for projecting a presentation document created by a PC onto a screen, so that it is possible to present the content of information visually, and such a projector is being widely used for conferences, study meetings and so on.

The PC and the projector usually transmit and receive an image signal each other by an analog connection through an RGB cable. However it is bothersome that a user needs to connect the PC and the projector, moreover in the case where, for example, the data to be projected are stored in plural PCs separately, the PC and the projector requires to be reconnected each time. In view of this, a wireless image transmission apparatus has been suggested as an alternative method to transmit an image signal from a PC to a projector by an infrared or a wireless LAN for the purpose of improvement in using the projector, and also a wireless transmission system to concurrently show image signals transmitted from plural PCs to one projector is also disclosed (for example refer to Patent Reference 1).

Patent Reference 1: Japanese Laid-Open Patent Application No. 2003-330436.

BRIEF SUMMARY OF THE INVENTION

According to the above-mentioned wireless transmission system, the user is able to know whether or not the user's own PC is connected to the projector, but the user is not able to know the reason why the user's own PC is not connected to the projector under the circumstances that plural PCs exist. In other words, the user is unable to know whether his own PC is not connected because the PC of another user is connected, or because a problem has occurred in the communication path.

Additionally under the circumstances that plural projectors exist, the user is not able to know to which projector the user's own PC can be connected or to which projector the user's own PC should be connected.

The present invention has been conceived considering the problems. An object of the present invention is to provide an image transmission system which enables a user to know a communication status between a PC and a projector.

In order to achieve the above-mentioned object, the image transmission system of the present invention is characterized in that the image transmission system includes plurality of image generating apparatuses, each of which generates plurality of images, and an image projecting apparatus for projecting the plurality of images transmitted from the image generating apparatus. The image projecting apparatus includes: a status monitoring unit for monitoring a status of communication with the plurality of image generating apparatuses; a beacon generating unit for generating information related to the communication status which is being monitored by the status monitoring unit; and a transmitting unit for transmitting the generated information to the image generating apparatus. The image generating apparatus includes: a receiving unit for receiving the information from the image projecting apparatus; an analyzing unit for analyzing the information; and a display unit for displaying a result of the analysis of the analyzing unit. Accordingly the PC receives and displays the information, which is transmitted constantly from the projector, related to the communication status with the projector, and therefore the user is able to understand the communication status between the PC and the projector.

Here the analyzing unit identifies the image projecting apparatus to be an originator of the information. The image generating apparatus further include a notification unit for notifying the identified image projecting apparatus of the reception of the information. The status monitoring unit counts the number of notifications, as the number of the image generating apparatuses connected to the image projecting apparatus, and the beacon generating unit may generate the information including the number of the image generating apparatuses. Accordingly the PC receives, from the projector, and displays the information including the number of PCs connected to the projector, and therefore the user is able to know the number of users currently connected to the projector.

The image projecting apparatus further includes an ID assignment unit for assigning a unique identifier to identify the image projecting apparatus. The beacon generating unit generates the information including the identifier. The receiving unit receives the information from the plurality of image projecting apparatuses, the analyzing unit identifies the image projecting apparatus to be an originator of the information based on the identifier, and it is preferable that the display unit displays the identifier of the identified image projecting apparatus. Accordingly the user is able to know the projector to which the PC should be connected in the case where plural of projectors exist.

The image generating apparatus further includes an inquiry unit for accepting the assignment of the identifier of the image projecting apparatus, generating a confirmation packet for inquiring about the location of the image projecting apparatus, and transmitting the generated confirmation packet to the image projecting apparatus assigned the identifier. The image projecting apparatus further includes: a confirmation packet receiving unit for receiving the confirmation packet; and a response output unit for outputting a response to the reception of the confirmation packet upon receiving the confirmation packet. Accordingly the PC transmits a confirmation packet to the projector, and the projector received the confirmation packet respond, and therefore the user is able to know the location of the projector to which the PC display image should be transmitted.

It should be noted that the present invention can be realized as the image transmission system, be realized as the image transmission method using the characteristics included in the respective apparatuses configuring the image transmission system as steps, and also be realized as a program for causing the computer to execute the steps. Furthermore it is obvious that such a program can be distributed through recording media such as CD-ROM and transmission media such as Internet.

As mentioned above, according to the image transmission system of the present invention, the information related to the projector's communication status, which is transmitted from the projector constantly, is displayed on a PC side. A user is, therefore, able to know the communication status between the PC and the projector.

Additionally the user is able to know the projector to which a display image on the PC should be transmitted, as a confirmation packet is transmitted from the PC to the projector side and the projector which received the confirmation packet responds by a buzzer, an LED lamp and the like.

DETAILED DESCRIPTION OF THE INVENTION

Figure 1:
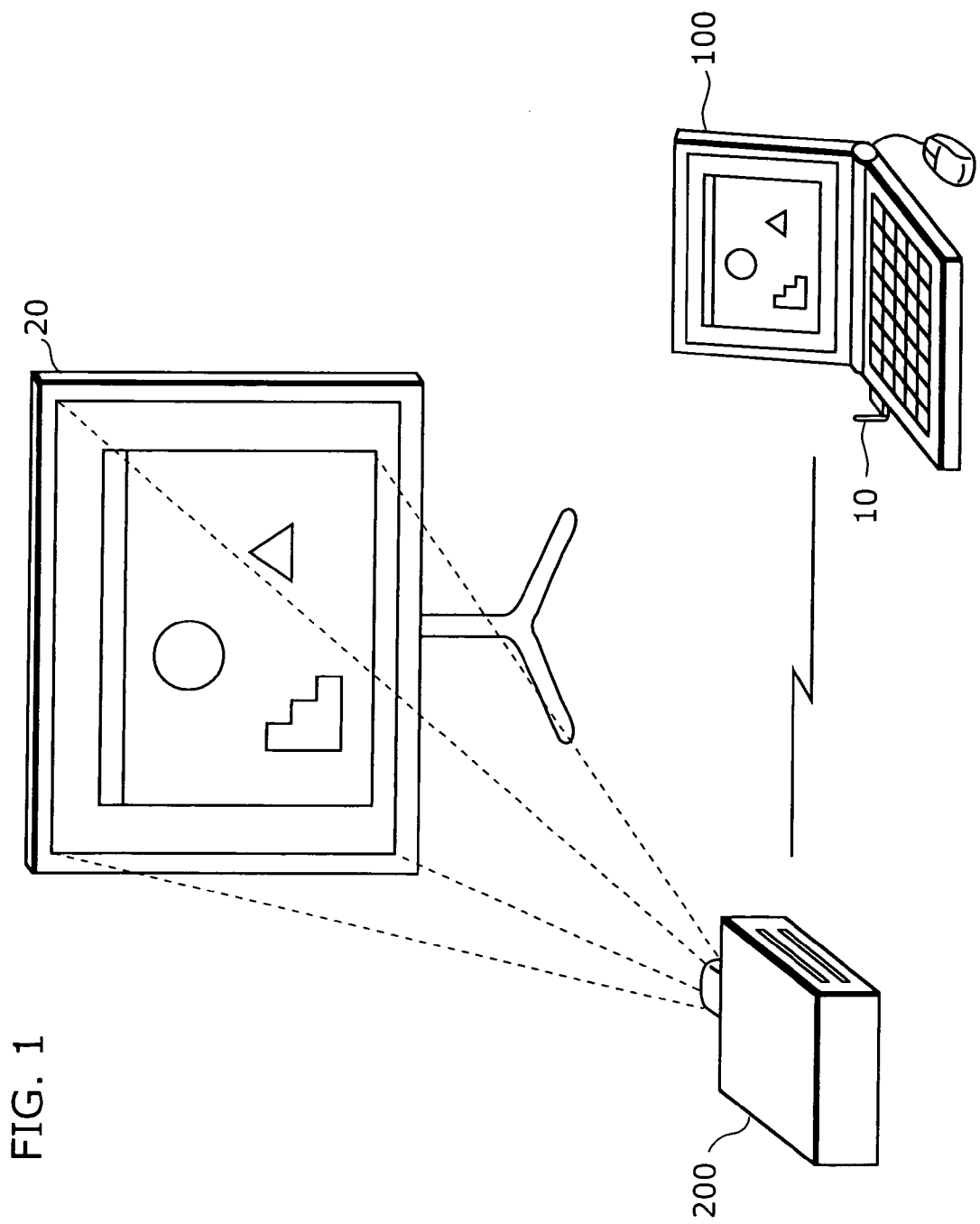
FIG. 1 is a drawing to show an external configuration of an image transmission system for the present embodiment of the present invention.

FIG. 1 is a drawing to show an external configuration of the image transmission system for the present embodiment.

The image transmission system transmits an image displayed on a PC 100 from the PC 100 to a projector 200, and then the received display image is projected onto a screen 20 in the projector 200. The PC 100 is equipped with a wireless LAN card 10 storing a wireless LAN chip so as to transmit an image signal to the projector 200 through a network.

Figure 2:
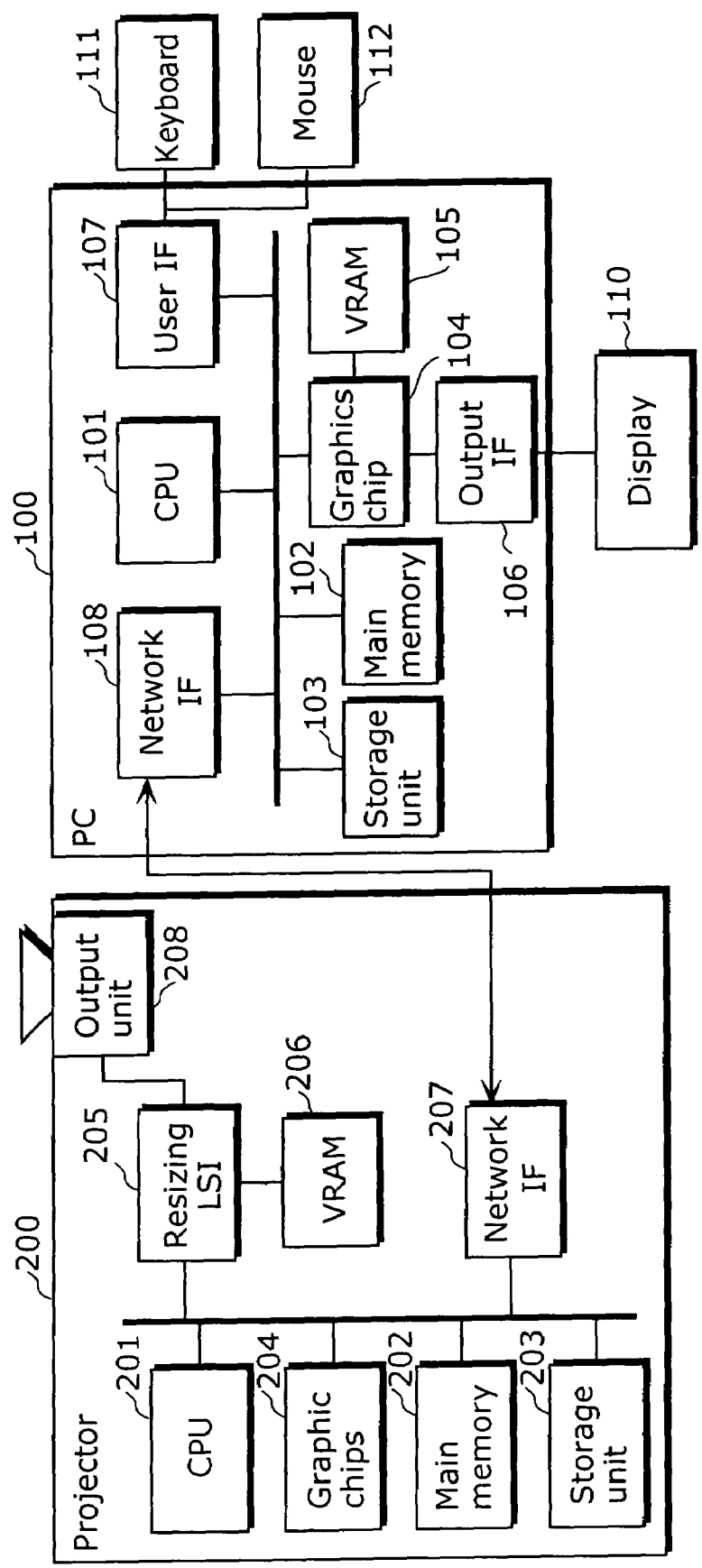
FIG. 2 is a block diagram to show a hardware configuration of a PC and a projector included in the image transmission system.

FIG. 2 is a block diagram to show a hardware configuration of the PC 100 and the projector 200 included in the image transmission system for the present embodiment.

As shown in FIG. 2, the PC 100 has a CPU 101, a main memory 102, a storage unit 103, a graphics chip 104, a VRAM 105, an output IF 106 to output onto a display 110, a user IF 107 to obtain an instruction signal based on a user's operation from an input unit such as a keyboard 111 and a mouse 112, and a network IF 108, which is an interface to communicate with the projector 200, a server and so on through a network such as LAN.

The projector 200 has a CPU 201, a main memory 202, a storage unit 203, a graphics chip 204, a resizing LSI 205, a VRAM 206, a network IF 207 and an output unit 208.

Figure 3:
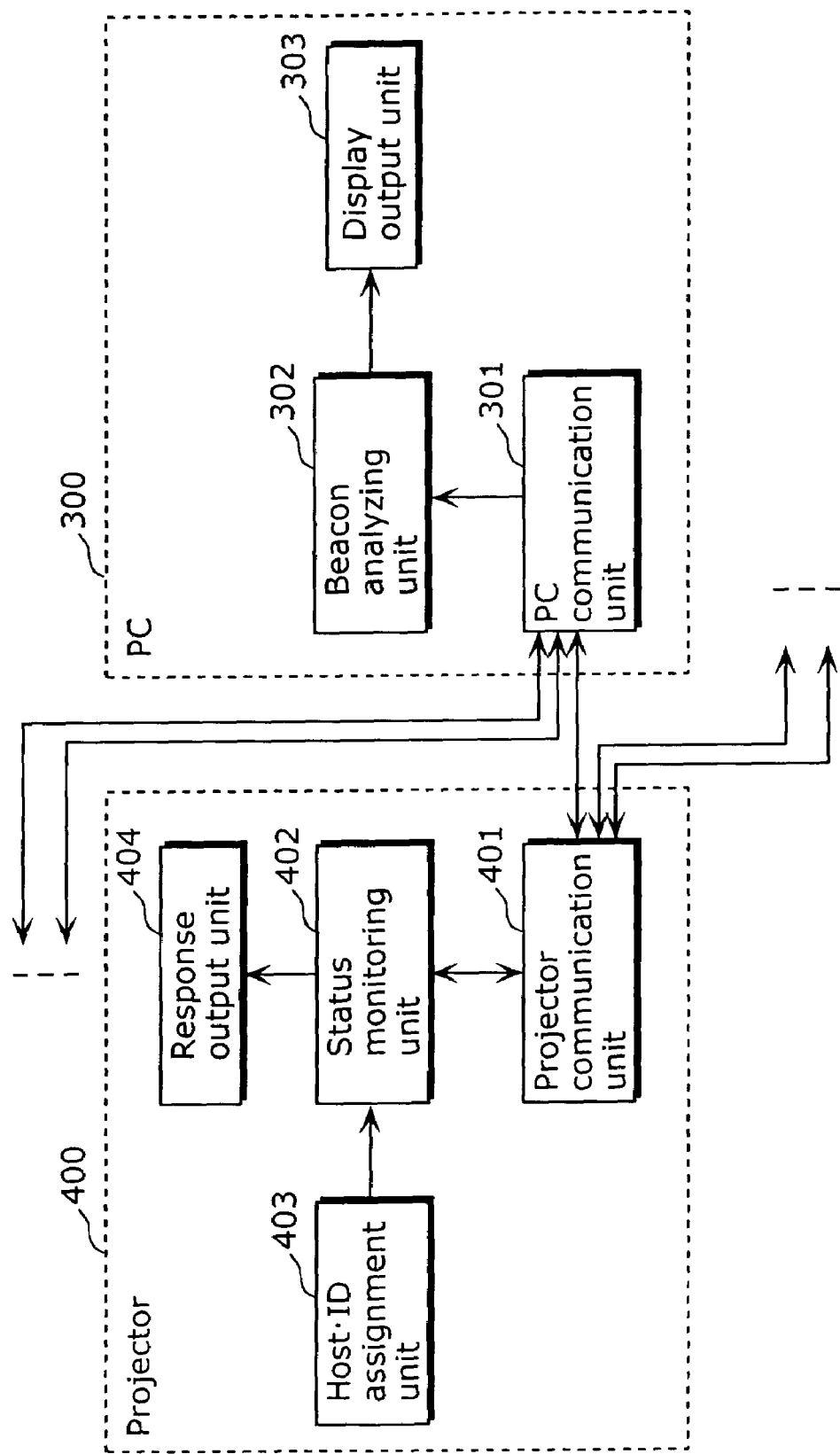
FIG. 3 is a block diagram to show a functional configuration of the PC and the projector included in the image transmission system for the present embodiment.

FIG. 3 is a block diagram to show a functional configuration of the PC and the projector included in the image transmission system for the present embodiment.

As shown in FIG. 3, a PC 300 has a PC communication unit 301, a beacon analyzing unit 302 and a display output unit 303, and a projector 400 has a projector communication unit 401, a status monitoring unit 402, a host ID assignment unit 403 and a response output unit 404.

The PC communication unit 301 is a processing unit which receives information (beacon) related to the communication status of the projector 400 from the projector 400, and also transmits a connection request packet to request a connection to the projector 400, a confirmation packet to inquire about the communication status and so on, and the PC communication unit 301 is realized as the network IF 108 and the like.

The beacon analyzing unit 302 is a processing unit which obtains and analyzes the beacon which is received by the PC communication unit 301, and the beacon analyzing unit 302 is realized as the CPU 101 and the main memory 102 and the like.

The display unit 303 is a processing unit which outputs the result of the analysis by the beacon analyzing unit 302 onto a display unit, and the display output unit 303 is realized as the graphics chip 104 and the like.

The projector communication unit 401 is a processing unit which transmits a beacon to the PC 300, and also receives a connection request packet and so on from the PC 300, and the projector communication unit 401 is realized as the network IF 207 and the like.

The status monitoring unit 402 is a processing unit which generates a beacon by monitoring the communication status of the projector 400, obtains a confirmation packet and outputs a response signal to the response output unit 404, and the status monitoring unit 402 is realized as the CPU 201 and the like.

The host ID assignment unit 403 is a processing unit which assigns a host name and a projector ID that are the identification information of the projector 400, and the host ID assignment unit 403 is realized as the CPU 201 and the like. The host ID assignment unit 403, for example, accepts an input of a host name from a user, and assigns the inputted host name at the time of initial setting of the projector 400. And also the host ID assignment unit 403 assigns, at the time of activation of the projector 400, a unique projector ID based on an MAC address and an IP address assigned each time to the network IF 207.

The response output unit 404 is an informing device, which runs when obtaining a response signal from the status monitoring unit 402, and the response output unit 404 is realized as a buzzer, an LED lamp and the like.

It should be noted that the PC communication unit 301 and the projector communication unit 401 are able to communicate with one or more projectors 400 and one or more PCs 300 respectively.

Additionally, the projector 400 is able to project PC display image by switching a split-screen display (multi-display) to concurrently project plural PCs' display images by splitting the projecting screen, and a full-screen display to project one PC display image onto the screen of the projector using the entire screen area. It should be noted that the projector 400 may be configured to project plural PCs' display images by temporally splitting the entire screen of the projector. In this case, for example, it is possible to project plural PCs' display images onto the full screen of the projector by switching the PCs' display at a predetermined interval of time, and to project plural PCs' display images by switching operation from PC side.

Figure 4:
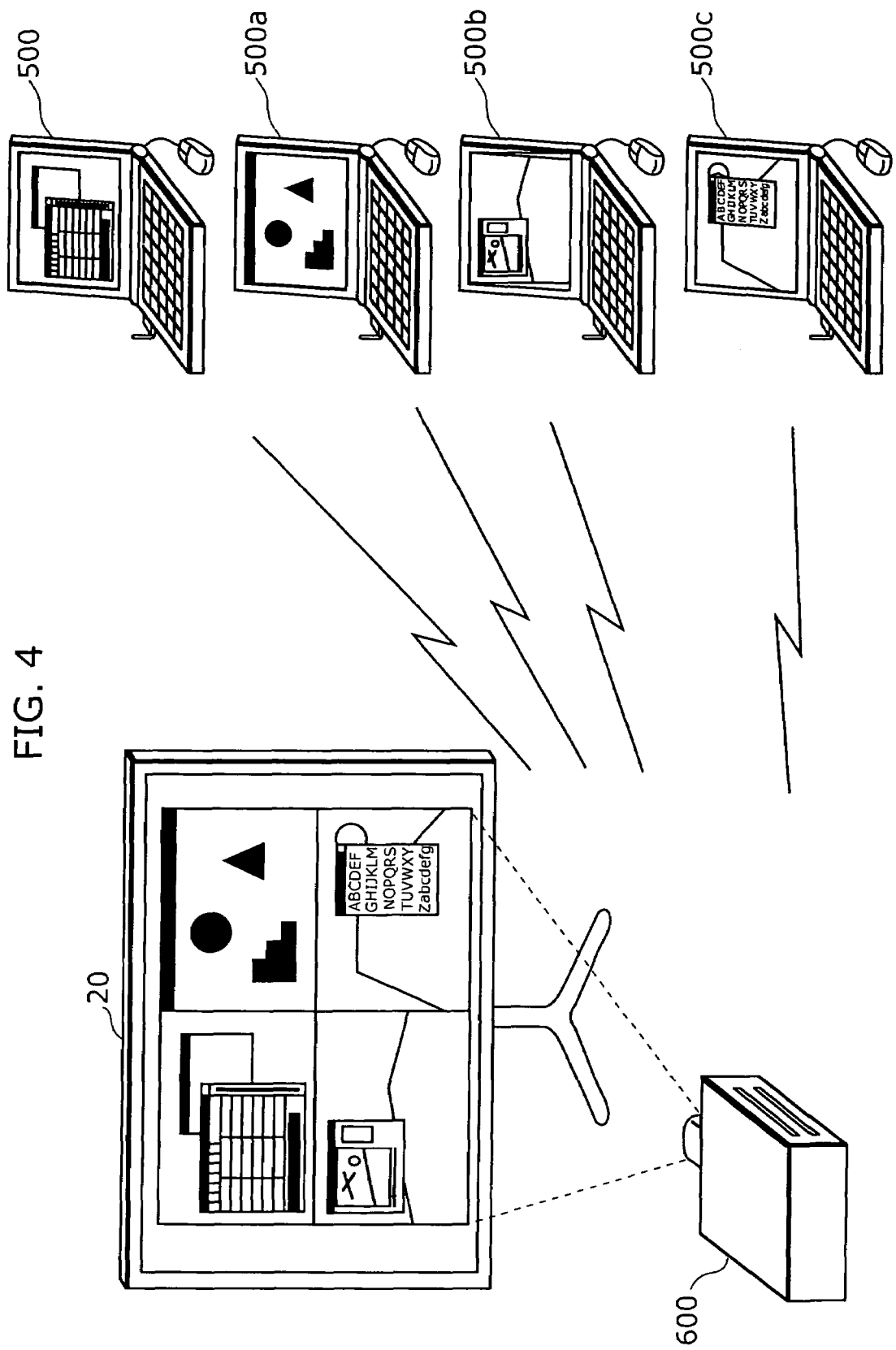
FIG. 4 is a drawing to show a situation of projecting plural PCs' display images onto a screen of one projector.

FIG. 4 is a drawing to show how plural PCs' display images are projected onto a screen of one projector.

In FIG. 4, it is shown that four PCs' display images are transmitted respectively to a projector 600 from the four PCs, the PC 500, the PC 500a, the PC 500b and the PC 500c, and the projector 600 projects the received PCs' display images onto the screen 20 by splitting into four segments.

Figure 5:
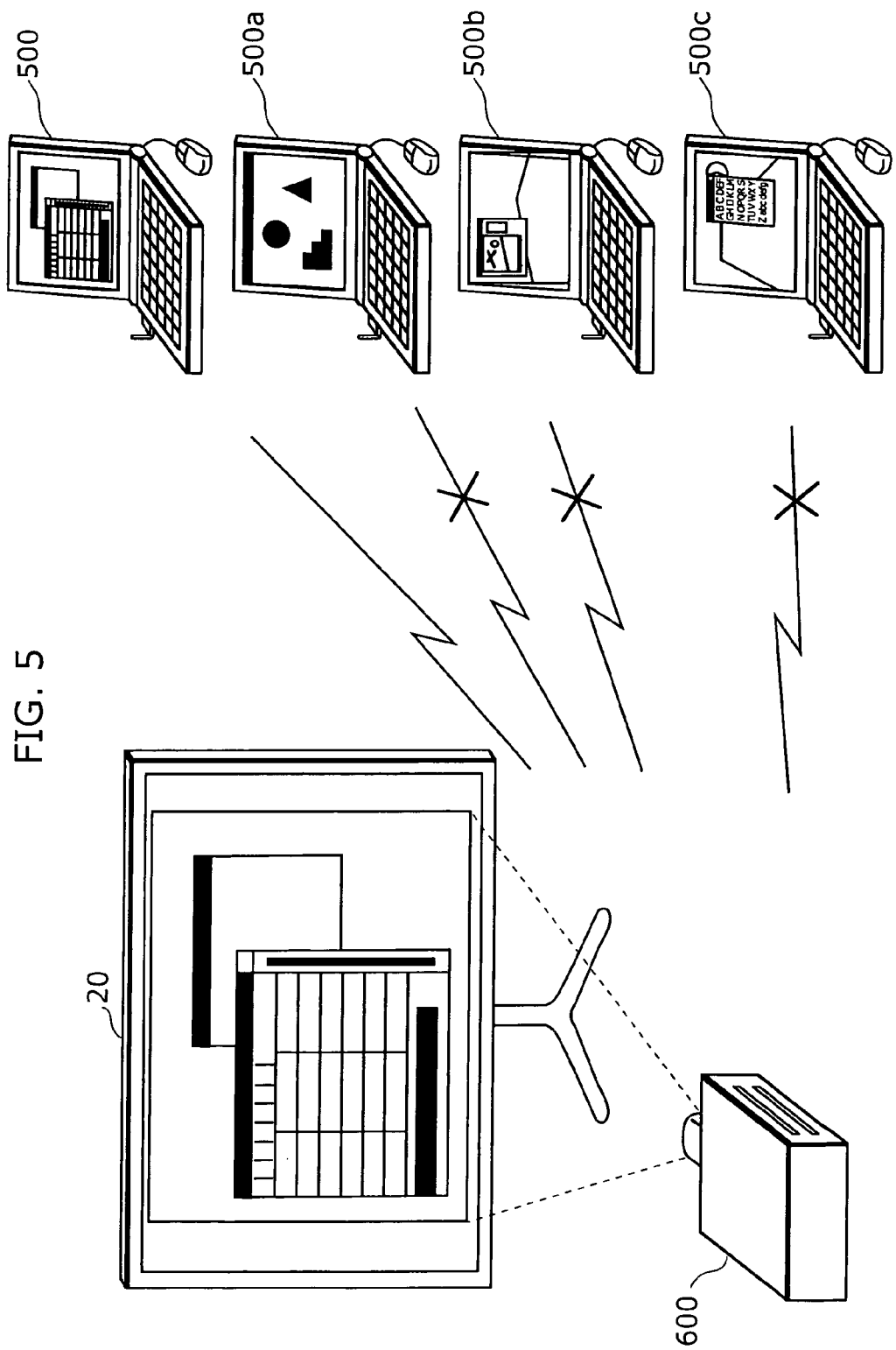
FIG. 5 is a drawing to show a situation of projecting one PC display image onto a screen of the projector using the entire screen.

FIG. 5 is a drawing to show how one PC display image is projected onto a screen of the projector using the entire screen.

In FIG. 5, it is shown that the display screen of the PC 500 is projected onto the screen 20 as a full-screen display on the side of the projector 600.

The processing operation of the image transmission system as configured above will be described hereafter.

Figure 6:
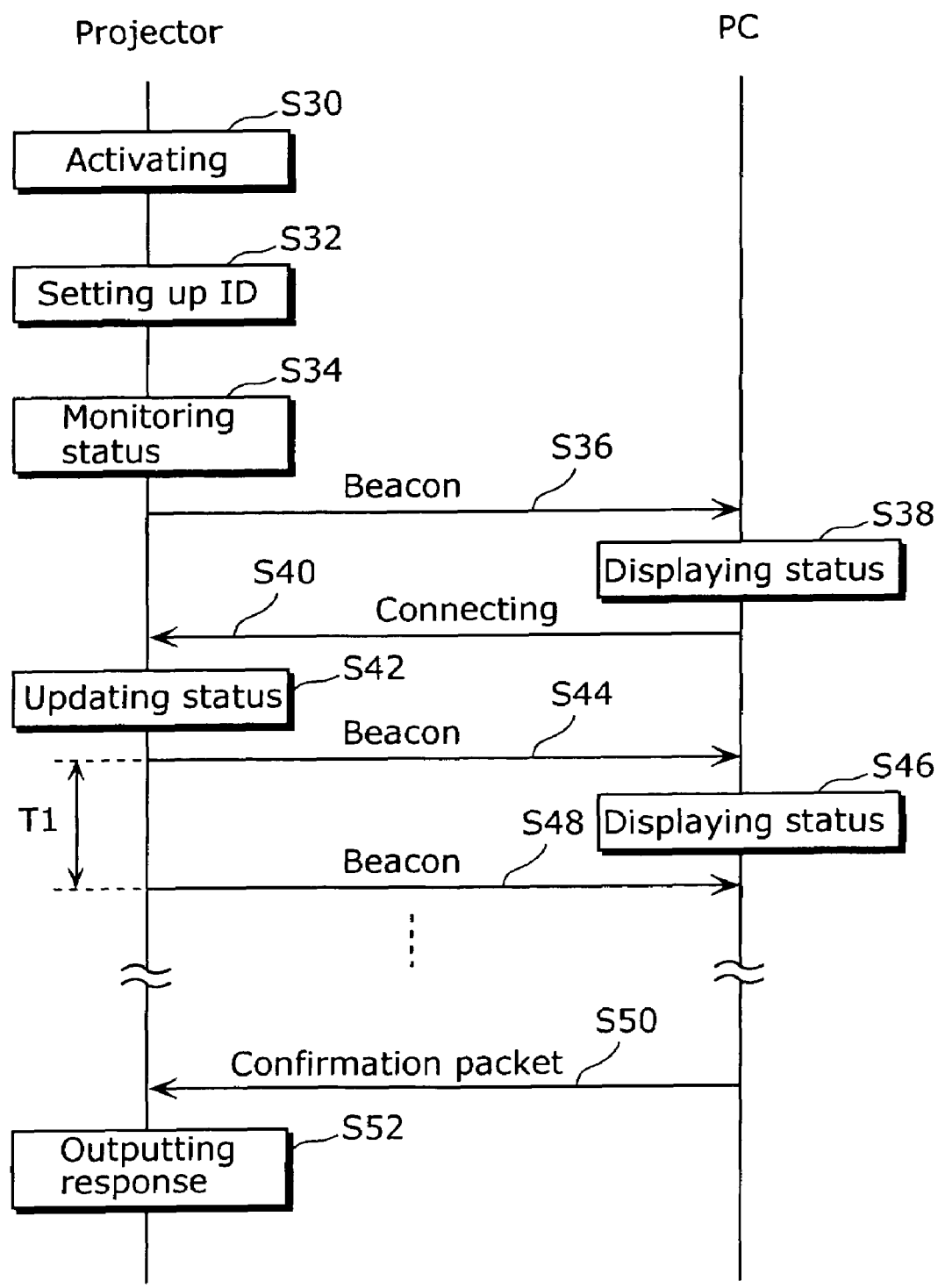
FIG. 6 is a communication sequence drawing between the PC and the projector.

FIG. 6 is a communication sequence drawing between the PC 300 and the projector 400.

Firstly, when the projector 400 is activated (S30), the host ID assignment unit 403 sets up a unique projector ID based on an MAC address or an IP address (S32). It should be noted that the host name, which was set up at the stage of the initial setting of the projector 400, is assumed to be stored in a main memory 202.

Secondly, the status monitoring unit 402 starts monitoring the communication status of the projector 400 (S34), and then the beacons are transmitted (broadcasted) at a time to one or more of the PC 300 (S36).

In the PC 300 which received the beacon, the beacon analyzing unit 302 analyzes the received beacon, and then the status of communication with the projector 400 is displayed through the display output unit 303 (S38).

Here, when the PC 300 sends a connection request packet to the projector 400 (S40), in the projector 400 the status monitoring unit 402 updates the communication status (S42), and subsequently a beacon is generated based on the updated communication status, and then the beacon is broadcasted to each PC 300 (S44).

In the PC 300 which received the beacon, the beacon analyzing unit 302 analyzes the beacon in the same way, and then the updated status of communication with the projector 400 is displayed through the display output unit 303 (S46).

The projector 400 transmits a beacon to each PC 300 at a predetermined interval of time T1 (for example every one second) (S48), and then the communication status of the projector 400 is informed each PC 300 constantly.

Here, in the case where the PC 300 sends a confirmation packet to the projector 400 (S50), the projector 400 which received the confirmation packet outputs a response by activating the response output unit 404 (S52).

Figure 7:
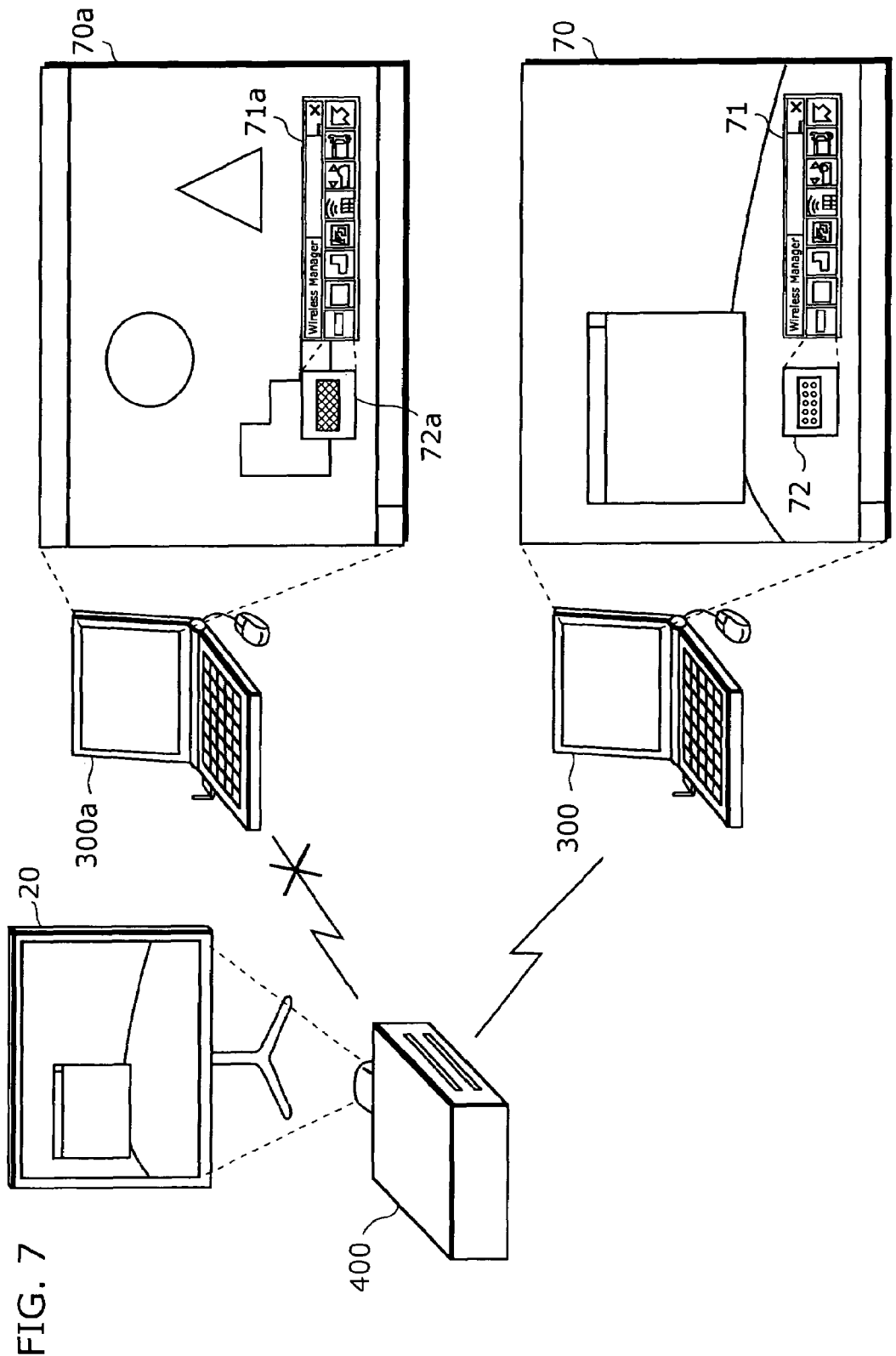
FIG. 7 is a drawing to describe a case that plural PCs communicate with one projector.

FIG. 7 is a drawing to describe a case that plural PCs communicate with one projector.

FIG. 7 shows one projector 400, the PC 300 whose connection with the projector 400 is established and also the PC 300 is currently connected with the projector 400, and a PC 300a whose connection with the projector 400 is not established.

Here, the connection being established means that a beacon is in a transmittable and receivable state, while the connection not being established means that beacon is not either in transmittable or receivable state.

Furthermore, the status being currently connected means that a transmission of a PC display image to the projector 400 is ready to be executed, while the status not being currently connected means that a transmission of a PC display image to the projector 400 is not ready to be executed. For example, in a case where the PC is connected to a projector other than the projector 400 under a status that beacon is in a transmittable and receivable state, the PC is under a status not being connected to the projector 400.

In the PC 300 whose connection with the projector 400 is established, a communication status display unit 72 to show a communication status with the projector 400 is set up on a launcher bar 71 on a PC display 70. In other words, the user of the PC 300 is able to know that the PC display image is able to be transmitted to the projector 400 based on how the communication status display unit 72 displays.

In the same way, in the PC 300a whose connection with the projector 400 is not established, a communication status display unit 72a is set up on a launcher bar 71a on a PC display 70a, and therefore the user of the PC 300a is able to know that the PC display image is not able to be transmitted to the projector 400.

In FIG. 7, it shows the patterns how the communication status display units 72 and 72a show (the connection established is shown by spots, while the connection not established is shown by meshes). As other options it is possible to use colors, flashing and the like. Moreover, the two different statuses of communication are described, that are the connection being established and the connection not being established here. Additionally, for example, the following statuses can be represented by above mentioned methods: (1) a display image is currently transmitted from the own PC to the projector; (2) the display image is transmittable to the projector; (3) although the connection is established, the display image is not transmittable to the projector as another user is currently transmitting a display image to the projector; and (4) the connection is not established.

Figure 8:
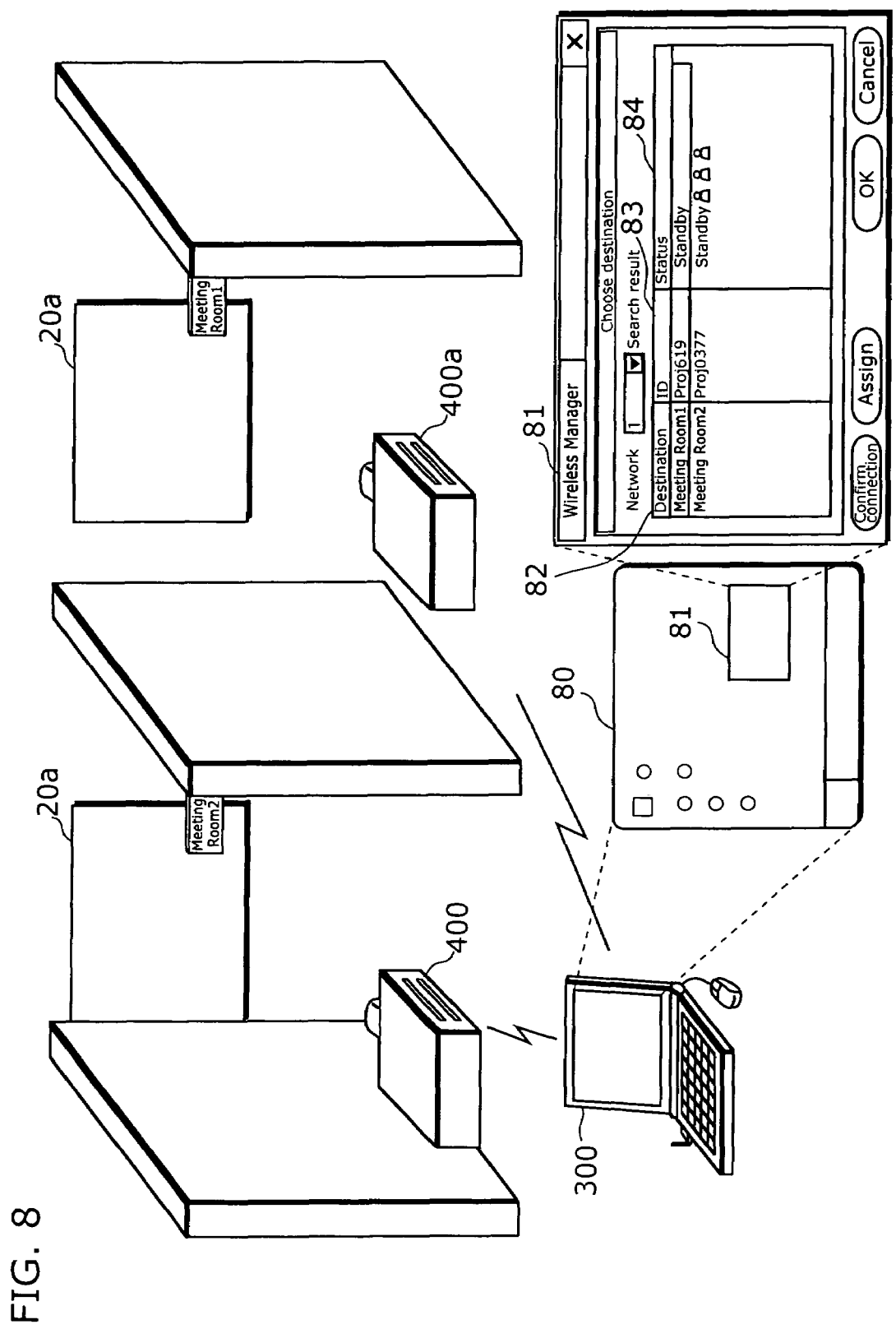
FIG. 8 is a drawing to describe a case that one PC communicates with plural projectors.

FIG. 8 is a drawing to describe a case where one PC communicates with plural projectors.

FIG. 8 shows one PC 300 and plural projectors 400 and 400a which are ready to communicate with the PC 300. In other words the PC 300 receives beacons from the projector 400 and the projector 400a respectively. At this time the beacons transmitted from the projectors 400 and 400a include the host names and the projector IDs assigned to the respective projectors, and in the PC 300, the beacon analyzing unit 302 makes determination, from which projectors the beacon was transmitted.

The PC 300 displays a list of projectors being originators of the received beacon in a communication status display window 81 on the PC display 80.

The communication status display window 81 includes a destination field 82 to show a host name, an ID field 83 to show a projector ID and a status field 84 to show a communication status of the projector, and the status field 84 shows visually the number of PCs to which the projector is connected.

In FIG. 8, a host name "Meeting Room 1" and a projector ID "Proj619" are assigned to the projector 400a, and it is shown that the projector 400a is not connected to any PC and under a standby status in the communication status display window 81. And also a host name "Meeting Room 2" and a projector ID "ProjO377" are assigned to the projector 400, and it is shown that three PCs are currently connected in the communication status display window 81. It should be noted that the projector 400 counts the number of responses from the PCs, which is currently connected, to the transmitted beacon, and the number of responses as the number of users under connection is shown in the communication status display window 81. For example, when the power of the PC is turned off, the number of PCs being connected is decreased as the PC does not respond to the beacon.

It should be noted that it is also possible to inform the projector that the PC is currently connected by means of sending a packet on a regular basis from the PC being connected.

Furthermore, the PC may respond to the projector when the connection to the projector is established, and the number of PCs whose connections to the projector are established may be shown as the number of users being currently connected, or the number of PCs which is actually receiving display image may be shown in the communication status display window 81.

Figure 9:
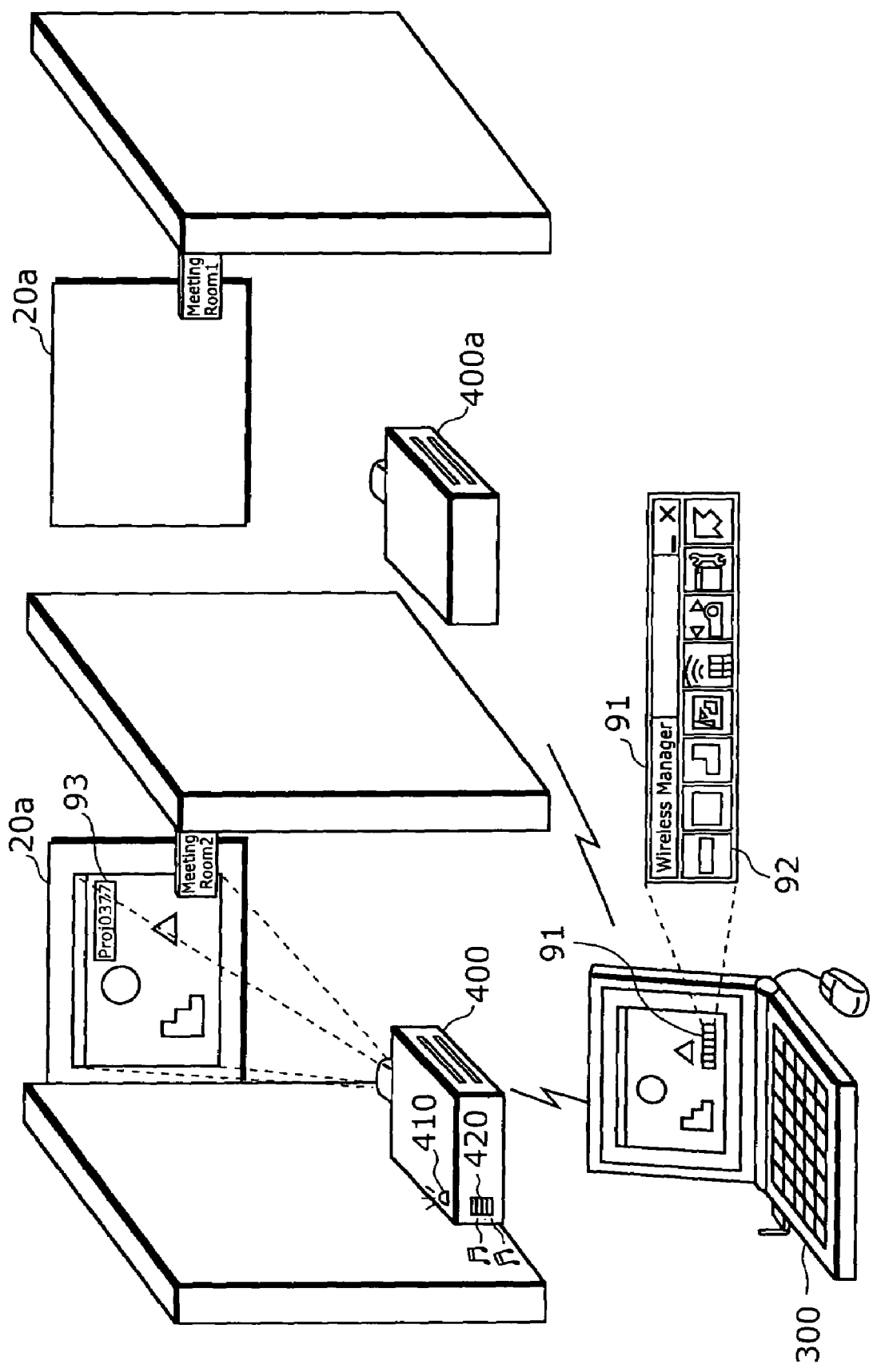
FIG. 9 is a drawing to describe a case that a confirmation packet is transmitted from the PC to the projector.

FIG. 9 is a drawing to describe a case that a confirmation packet is transmitted from the PC to the projector.

FIG. 9 shows one PC 300, the projector 400 projecting a PC display image received from the PC 300 onto a screen 20a, and the projector 400a which is ready to communicate with the PC 300.

Here, when the PC 300 accepts an operation of pressing down a connection confirmation button 92 on a launcher bar 91 on the PC display, the confirmation packet is transmitted to the projector 400. And then when the projector 400 receives the confirmation packet, an LED lamp 410 flashes or a buzzer 420 sounds so as to respond to the confirmation packet. At this time, the projector 400 may show a display indicating that a response being executed by showing the assigned projector ID on an ID display unit 93 of the screen 20a.

It should be noted that the PC 300 accepts an assignment of a desired projector out of the list of the projectors displayed in the communication status display window 81 as shown in FIG. 8, and the PC 300 accepts an operation pressing down the connection confirmation button in the communication status display window 81 and then the confirmation packet may be sent to the assigned projector.

According to the image transmission system of the present embodiment, the projector transmits constantly information related to the communication status of the projector to the PC which are ready to communicate, and the information related to the transmitted communication status of the projector is shown at PC side, and therefore the user is able to know the communication status between the own PC and the projector.

Furthermore, when the confirmation packet is sent from the PC to the projector side by specifying the host name and so on, the projector which has received the confirmation packet responds by a buzzer, an LED lamp and so on, and therefore the user is able to know the projector to be transmitted the PC display image.

The image transmission system of the present invention is described above based on the present embodiment, but the present invention is not limited to the present embodiment.

For example, the communication between the PC and the projector uses wireless LAN in the above present embodiment, but it is obvious that wired LAN also can be used alternatively.

Additionally, the projector is used for the description of an image projecting apparatus, but a plasma display panel and the like may be used as a display apparatus.

The image transmission system of the present invention is applicable to a system for transmitting an image from a PC and the like as an image generating apparatus to a projector and the like as an image projecting apparatus. Particularly the image transmission system is suitable for a presentation and the like using a wireless projector.

The invention claimed is:

1. An image transmission system comprising:
   a plurality of image generating apparatuses, each image generating apparatus of said plurality of image generating apparatuses being operable to generate and transmit a respective image; and
   an image projecting apparatus operable to project each respective image transmitted from each image generating apparatus of said plurality of image generating apparatuses,
   wherein said image projecting apparatus includes:
      a projection unit operable to receive and project each respective image transmitted from said plurality of image generating apparatuses;
      a status monitoring unit operable to monitor a status of communication between said image projecting apparatus and said plurality of image generating apparatuses;
      a beacon generating unit operable to generate information related to the status of communication monitored by said status monitoring unit; and
      a transmitting unit operable to transmit the information generated by said beacon generating unit to said plurality of image generating apparatuses, and
   wherein each respective image generating apparatus of said plurality of image generating apparatuses includes:
      a receiving unit operable to receive the information transmitted from said transmitting unit of said image projecting apparatus;
      an analyzing unit operable to analyze the information received by said receiving unit; and
      a display unit operable to display whether or not said image projection apparatus can project the respective image generated by said respective image generating apparatus of said plurality of image generating apparatuses, based on a result of the analysis of said analyzing unit.

2. The image transmission system according to claim 1, wherein said beacon generating unit is operable to generate the information related to the status of communication at a predetermined interval of time.

3. The image transmission system according to claim 1, wherein said transmitting unit is operable to broadcast the information generated by said beacon generating unit to said plurality of image generating apparatuses.

4. The image transmission system according to claim 1, wherein said analyzing unit is operable to identify said image projecting apparatus as an originator of the information generated by said beacon generating unit,
   wherein each image generating apparatus of said plurality of image generating apparatuses further includes a notification unit operable to notify said identified image projecting apparatus of the reception of the information generated by said beacon generating unit,
   wherein said status monitoring unit is operable to count a number of received notifications, as a number of image generating apparatuses, of said plurality of image generating apparatuses, connected to said image projecting apparatus, and
   wherein said beacon generating unit is operable to generate the information to include the counted number of image generating apparatuses.

5. The image transmission system according to claim 1, wherein said image projecting apparatus further includes an ID assignment unit operable to assign a unique identifier to identify said image projecting apparatus, and
   wherein said beacon generating unit is operable to generate the information to include the unique identifier.

6. The image transmission system according to claim 5, wherein said image transmission system further comprises a plurality of said image projecting apparatuses,
   wherein said receiving unit is operable to receive the information from said plurality of image projecting apparatuses,
   wherein said analyzing unit is operable to identify each respective image projecting apparatus of said plurality of image projecting apparatuses to be an originator of the information based on the unique identifier generated by each respective beacon generating unit of said plurality of image projecting apparatuses, and wherein said display unit is operable to display each respective unique identifier of each respective identified image projecting apparatus.

7. An image transmission system comprising:

a plurality of image generating apparatuses, each image generating apparatus of said plurality of image generating apparatuses being operable to generate and transmit a respective image; and an image projecting apparatus operable to project each respective image transmitted from each image generating apparatus of said plurality of image generating apparatuses, wherein said image projecting apparatus includes:

a status monitoring unit operable to monitor a status of communication between said image projecting apparatus and said plurality of image generating apparatuses;

a beacon generating unit operable to generate information related to the status of communication monitored by said status monitoring unit;

a transmitting unit operable to transmit the information generated by said beacon generating unit to said plurality of image generating apparatuses;

an ID assignment unit operable to assign a unique identifier to identify said image projecting apparatus;

a confirmation packet receiving unit operable to receive a confirmation packet inquiring about a location of said image projecting apparatus; and a response output unit operable to output a response to the reception of the confirmation packet upon receiving the confirmation packet, wherein said beacon generating unit is operable to generate the information to include the unique identifier, and wherein each respective image generating apparatus of said plurality of image generating apparatuses includes:

a receiving unit operable to receive the information transmitted from said transmitting unit of said image projecting apparatus;

an analyzing unit operable to analyze the information received by said receiving unit;

a display unit operable to display a result of the analysis of said analyzing unit; and an inquiry unit operable to accept the unique identifier of said image projecting apparatus, to generate the confirmation packet, and to transmit the generated confirmation packet to said image projecting apparatus having the unique identifier.

8. The image transmission system according to claim 7, wherein said response output unit is operable to output the response by making a buzzer sound or flashing an LED lamp.

9. An image transmission method of transmitting a plurality of images from a plurality of image generating apparatuses, each image generating apparatus of the plurality of image generating apparatuses generating and transmitting a respective image to an image projecting apparatus that projects each respective image transmitted from the plurality of image generating apparatuses, wherein said image transmission method comprises the following steps to be executed by the image projecting apparatus:

a projection step of projecting each respective image generated and transmitted from the plurality of image generating apparatuses;

a status monitoring step of monitoring a status of communication between the image projecting apparatus and the plurality of image generating apparatuses;

a beacon generating step of generating information related to the status of communication monitored in said status monitoring step; and a transmitting step of transmitting the information generated by said beacon generating step to the plurality of image generating apparatuses, and wherein said image transmission method comprises the following steps to be executed by each respective image generating apparatus of the plurality of image generating apparatuses:

a receiving step of receiving the information transmitted by said transmitting step;

an analyzing step of analyzing the information received by said receiving step; and a display step of displaying whether or not the image projecting apparatus can project the respective image generated by the respective image generating apparatus of the plurality of image generating apparatuses based on a result of the analysis performed by said analyzing step.

10. An image generating apparatus of an image transmission system including a plurality of image generating apparatuses, each image generating apparatus of the plurality of image generating apparatuses generating and transmitting a respective image, and including an image projecting apparatus that projects each respective image transmitted from the plurality of image generating apparatuses, each of said image generating apparatuses comprising: a receiving unit operable to receive, from the image projecting apparatus, information related to a status of communication between the plurality of image generating apparatuses and the image projecting apparatus;

an analyzing unit operable to analyze the received information received by said receiving unit; and a display unit operable to display whether or not the image projecting apparatus can project the respective image generated by said image generating apparatus based on a result of the analysis of the received information by said analyzing unit.

11. A computer-readable recording medium having a program recorded thereon, the program for use in an image generating apparatus of an image transmission system including a plurality of image generating apparatuses, each image generating apparatus of the plurality of image generating apparatuses generating and transmitting a respective image, and including an image projecting apparatus that projects each respective image transmitted from the plurality of image generating apparatuses, the program causing a computer to execute the following steps:

a receiving step of receiving, from the image projecting apparatus, information related to a status of communication between the plurality of image generating apparatuses and the image projecting apparatus, an analyzing step of analyzing the received information, and a displaying step of displaying, on each respective image generating apparatus of the plurality of image generating apparatuses whether or not the image projecting apparatus can project the respective image generated by the respective image generating apparatus based on a result of the analysis performed by said analyzing step.

12. An image projecting apparatus of an image transmission system including a plurality of image generating apparatuses, each image generating apparatus of the plurality of image generating apparatuses generating and transmitting a respective image, and including said image projecting apparatus that projects each respective image transmitted from the plurality of image generating apparatuses, said image projecting apparatus comprising:

a projection unit operable to receive and project each respective image transmitted from the plurality of image generating apparatuses;

a status monitoring unit operable to monitor a status of communication between said image projecting apparatus and the plurality of image generating apparatuses;

a beacon generating unit operable to generate information related to the status of communication monitored by said status monitoring unit; and a transmitting unit operable to transmit the information generated by said beacon generating unit to the plurality of image generating apparatuses, and to cause each respective image generating apparatus of the plurality of image generating apparatuses to display whether or not said image projecting apparatus can project the respective image.

13. A computer-readable recording medium having a program recorded thereon, the program for use in an image projecting apparatus of an image transmission systems including a plurality of image generating apparatuses, each image generating apparatus of the plurality of image generating apparatuses generating and transmitting a respective image, and including an image projecting apparatus that projects each respective image transmitted from the plurality of image generating apparatuses, the program causing a computer to execute the following steps:

a projection step of receiving and projecting each respective image generated and transmitted from the plurality of image generating apparatuses;

a monitoring step of monitoring a status of communication between the image projecting apparatus and the plurality of image generating apparatuses;

a beacon generating step of generating information related to the status of communication monitored in said monitoring step; and a transmitting step of transmitting the information generated by said beacon generating step to the plurality of image generating apparatuses, and causing each respective image generating apparatus of the plurality of image generating apparatuses to display whether or not the image projecting apparatus can project the respective image.

14. An image transmission system comprising:

a plurality of image generating apparatuses, each image generating apparatus of said plurality of image generating apparatuses being operable to generate and transmit a respective image; and an image display apparatus operable to display each respective image transmitted from each image generating apparatus of said plurality of image generating apparatuses, wherein said image display apparatus includes:

an image display unit operable to receive and display each respective image generated and transmitted from said plurality of image generating apparatuses;

a status monitoring unit operable to monitor a status of communication between said image display apparatus and said plurality of image generating apparatuses;

a beacon generating unit operable to generate information related to the status of communication monitored by said status monitoring unit; and a transmitting unit operable to transmit the information generated by said beacon generating unit to said plurality of image generating apparatuses, and wherein each respective image generating apparatus of said plurality of image generating apparatuses includes:

a receiving unit operable to receive the information transmitted from said transmitting unit of said image display apparatus;

an analyzing unit operable to analyze the information received by said receiving unit; and a display unit operable to display whether or not said image display apparatus can display the respective image generated by said respective image generating apparatus of said plurality of image generating apparatuses, based on a result of the analysis of said analyzing unit.

* * * * *